United States Patent
Sasaki (10) Patent No.: US 8,108,600 B2
(45) Date of Patent: *Jan. 31, 2012

(54) DATA STORAGE APPARATUS THAT APPROPRIATELY REVISES FDCB INFORMATION DURING BACKGROUND FORMATTING

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 627 days.

This patent is subject to a terminal disclaimer.

(21) Appl. No.: 11/209,780

(22) Filed: Aug. 24, 2005

(65) Prior Publication Data

US 2005/0276195 A1 Dec. 15, 2005

Related U.S. Application Data

(63) Continuation of application No. 10/202,869, filed on Jul. 26, 2002, now Pat. No. 6,996,666.

(30) Foreign Application Priority Data

Jul. 30, 2001 (JP) ................................ 2001-229258

(51) Int. Cl.
*G06F 12/00* (2006.01)
*G11B 5/09* (2006.01)

(52) U.S. Cl. .................... 711/112; 369/53.15; 369/47.1; 369/59.1

(58) Field of Classification Search .................. None
See application file for complete search history.

(56) References Cited

U.S. PATENT DOCUMENTS

| | | | | |
|---|---|---|---|---|
| 5,177,720 A | * | 1/1993 | Kondo | 369/30.04 |
| 5,535,372 A | * | 7/1996 | Benhase et al. | 703/23 |
| 6,172,955 B1 | * | 1/2001 | Hashimoto | 369/53.37 |
| 6,587,416 B1 | * | 7/2003 | Tsukihashi | 369/59.14 |
| 6,760,288 B2 | * | 7/2004 | Ijtsma et al. | 369/53.18 |
| 6,996,666 B2 | * | 2/2006 | Sasaki | 711/112 |

FOREIGN PATENT DOCUMENTS

| | | |
|---|---|---|
| EP | 0 364 176 A2 | 4/1990 |
| EP | 08-203211 | 8/1996 |
| EP | 0878 799 A2 | 11/1998 |
| EP | 0899 735 A2 | 3/1999 |
| JP | 8-203211 | 8/1996 |
| JP | 11-134799 | 5/1999 |

* cited by examiner

*Primary Examiner* — Denise Tran (74) *Attorney, Agent, or Firm* — Dickstein Shapiro LLP (57) ABSTRACT

A data storage apparatus, including a controller that formats a rewritable recording medium in the background, interrupts the background formatting when a host computer requests to store data in the rewritable recording medium, stores the data in the rewritable recording medium after interrupting the background formatting, revises control information stored in a predetermined region of the rewritable recording medium after storing the data, and resumes the background formatting after revising the control information. The data storage apparatus according can revise control information indicating the address up to which the background formatting has been performed and the address of an unformatted recording region in which user data have been recorded, for example, at an appropriate timing during the background formatting.

5 Claims, 10 Drawing Sheets

DATA STORAGE APPARATUS THAT APPROPRIATELY REVISES FDCB INFORMATION DURING BACKGROUND FORMATTING

This application is a continuation of application Ser. No. 10/202,869, filed on Jul. 26, 2002, which is U.S. Pat. No. 6,996,666, which is hereby incorporated by reference in its entirety.

BACKGROUND OF THE INVENTION

1. Field of the Invention

The present invention generally relates to a data storage apparatus, and more particularly, to a rewritable data storage apparatus such as a CD-RW disk drive and a DVD+RW disk drive that can interrupt background formatting when data storage is requested.

2. Description of the Related Art

Universal Disk Format (UDF) is known as the standard file format for rewritable data storage media. Since CD-RW and DVD+RW are further capable of overwriting in addition to being writable, they employ Random UDF that enables a disk drive to store and retrieve data randomly. In the case of CD-RW disks, a user is required to format the recording region of a CD-RW disk, entirely or partially, by recording dummy data before storing data.

In the case of DVD+RW disks, the user is still required to format a DVD+RW disk by recording dummy data in a recording region if the user wishes the DVD+RW disk to be retrievable (readable) by a conventional DVD-ROM drive.

Accordingly, the formatting of a disk takes time since the recording region of the disk needs to be filled with dummy data. The more storage capacity the disk has, the more time is required to format the disk. The user cannot store data until the formatting of the disk is completed.

A conventional solution to the above problem is background formatting wherein an optical disk drive formats a portion of an optical disk so that it can store data in or retrieve data from the optical disk even if the optical disk is hot fully formatted. Japanese Patent Laid-open Application No. 11-134799 discloses a data storage apparatus such as a CD-RW disk drive and a DVD+RW disk drive that formats an optical disk in the background so that it can store data in the optical disk within a short time after the background formatting is requested. In the background formatting, the data storage apparatus stores dummy data in any unrecorded (unformatted) region of the optical disk while no request from the host computer for data storage or retrieval is being processed. If the host computer requests for data storage or data retrieval during the background formatting, the optical disk drive-interrupts the background formatting and stores (retrieves) data in (from) the optical disk.

Accordingly, the data storage apparatus performs the background formatting and the data storage (retrieval) requested by the host computer in parallel (concurrently). That is, even if the background formatting is proceeding, the data storage apparatus can store (retrieve) data in (from) any region of the optical disk. The user can eject the optical disk while the background formatting is proceeding.

It is necessary to record which portion of the optical disk has been formatted and in which portion of the optical disk data have been stored so that the optical disk drive can randomly store data in any region of the optical disk or eject the optical disk while the optical disk is being formatted in the background.

In the case of a DVD+RW disk, the above information is recorded in a region called a Formatting Disk Control Block (FDCB) in the lead-in region of the disk.

FDCB includes recording state information indicating whether the disk is not formatted, is being formatted, or has been formatted, address information indicating the address of the formatted region of the disk, and bit map information indicating whether a region is recorded or unrecorded.

When a partially formatted optical disk is inserted, the optical disk drive can resume background formatting and store dummy data only in the unrecorded region by referring to the FDCB.

FDCB is so important, especially in the case wherein the optical disk is ejected during the background formatting, that the optical disk drive corrupts user data if the information stored in FDCB is incorrect, by overwriting dummy data on the user data.

On the other hand, if FDCB is rewritten too often, the performance of the optical disk drive is lowered and the degrading of the optical disk is accelerated.

SUMMARY OF THE INVENTION

Accordingly, it is a general object of the present invention to provide a novel and useful data storage apparatus in which one or more of the problems described above are eliminated.

Another and more specific object of the present invention is to provide a data storage apparatus that can appropriately rewrite new information in connection with formatting and a recording previously stored in a recording medium.

To achieve the above objects, a data storage apparatus according to the present invention includes a controller that formats a rewritable recording medium in the background, interrupts the background formatting when a host computer requests to store data in said rewritable recording medium, stores said data in said rewritable recording medium after interrupting the background formatting, revises control information stored in a predetermined region of said rewritable recording medium after storing said data, and resumes the background formatting after revising said control information.

The data storage apparatus according to an embodiment of the present invention can revise control information indicating the address up to which the background formatting has been performed and the address of an unformatted recording region in which user data has been recorded, for example, at an appropriate timing during the background formatting.

Other objects, features, and advantages of the present invention will become more apparent from the following detailed description when read in conjunction with the accompanying drawings.

DETAILED DESCRIPTION OF THE PREFERRED EMBODIMENTS

The preferred embodiments of the present invention will be described in detail below by reference to the drawings.

Figure 1:
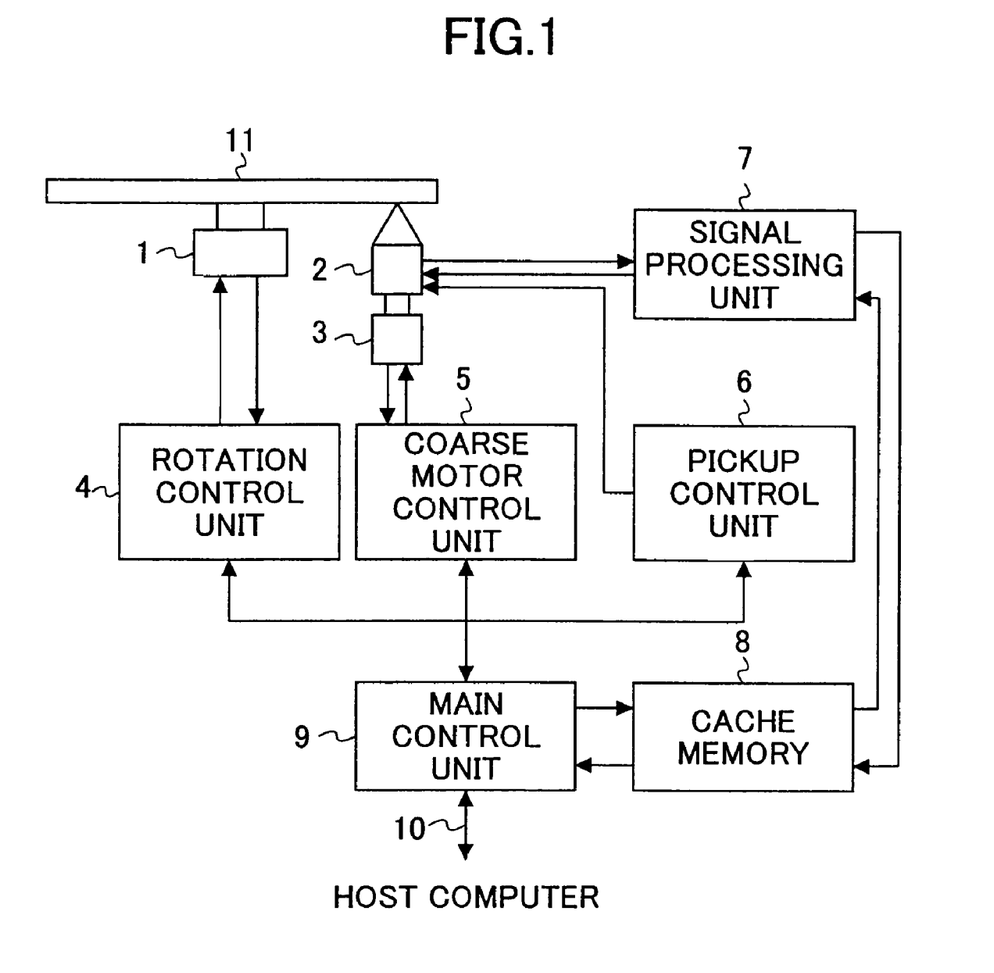
FIG. 1 is a block diagram showing an optical disk drive according to an embodiment of the present invention.

FIG. 1 is a block diagram showing an optical disk drive according to an embodiment of the present invention.

The optical disk drive includes spindle motor 1 that rotates optical disk 11, which is a rewritable optical disk such as CD-RW and DVD+RW, optical pickup 2 that has an embedded semiconductor laser therein and applies laser beam L to a recording region of optical disk 11, and coarse motor 3 that actuates optical pickup 2 in the radial direction of optical disk 11 in collaboration with a seek motor (not showed) embedded in optical pickup 2.

The optical disk drive further includes rotation control unit 4 that controls the rotation of spindle motor 1, coarse motor control unit 5 that controls the actuation of coarse motor 3, pickup control unit 6 that controls optical pickup 2, and signal processing unit 7 that processes a signal reproduced from optical disk 11 and a signal being recorded in optical disk 11 by optical pickup 2.

The optical disk drive further includes cache memory 8 that temporarily stores data retrieved from optical disk 11, and main control unit 9 that consists of CPU, ROM, and RAM, for example, and performs various functions according to an embodiment of the present invention in collaboration with the above units 4-7.

Main control unit 9 is connected to a host computer through external interface 10. In response to a request from the host computer, main control unit 9 transmits data retrieved from optical disk 11 to the host computer, and receives from the host computer data to be stored in optical disk 11.

The optical disk drive rotates optical disk 11 by spindle motor 1, actuates optical pickup 2 in the radial direction of optical disk 11, and applies laser beam L emitted by a semiconductor laser embedded in optical pickup 2 to a recording region of optical disk 11 so that the optical disk drive performs background formatting and user data storage in parallel according to the present invention.

In the case of recording, the optical disk drive receives data from the host computer through external interface 10. The data are temporarily stored in cache memory 8, and converted into a recording signal by signal processing unit 7. Optical pickup 2 applies laser beam L on the recording region of optical disk 11 in response to the recording signal.

In the case of retrieval, the optical disk drive retrieves data from optical disk 11 in response to a request for data retrieval of the host computer. The retrieved data are temporarily stored in cache memory 8, and transferred to the host computer through external interface 10.

FIGS. 2A-2D are schematic diagrams showing how data are stored in a recording medium such as a DVD+RW disk by background formatting and data storage in response to a user's request.

Figure 2A:
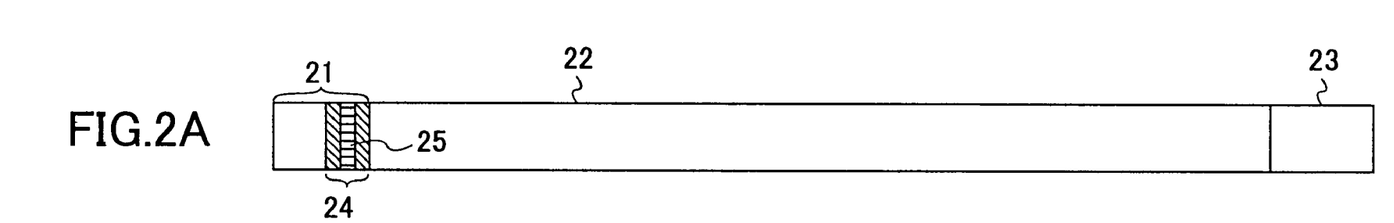
FIGS. 2A-2D are schematic drawings showing how the background formatting and the user data storage are performed according to an embodiment.

The recording medium has lead-in region 21, user data region 22, and lead-out region 23. When a blank (unformatted) disk is set in the optical disk drive (hereinafter referred to as drive), the drive initializes a portion 24 of lead-in region 21 in the foreground to form a region 25 called FDCB in region 24. The drive records "data storage status information" in FDCB 25. The drive is now ready to accept a request of the host computer for data storage (FIG. 2A).

Figure 2B:
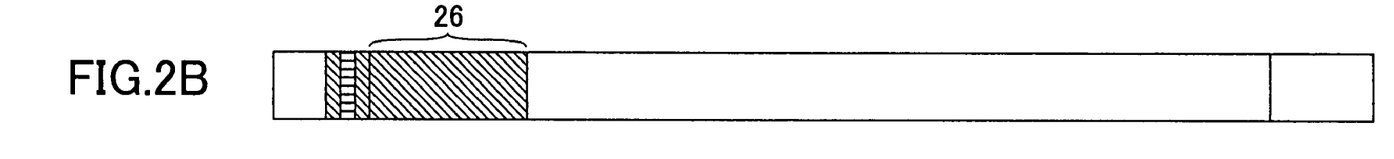

The drive starts formatting user data region 22 from the inner radius to the outer radius of the disk by storing dummy data therein in the background (FIG. 2B).

Figure 2C:
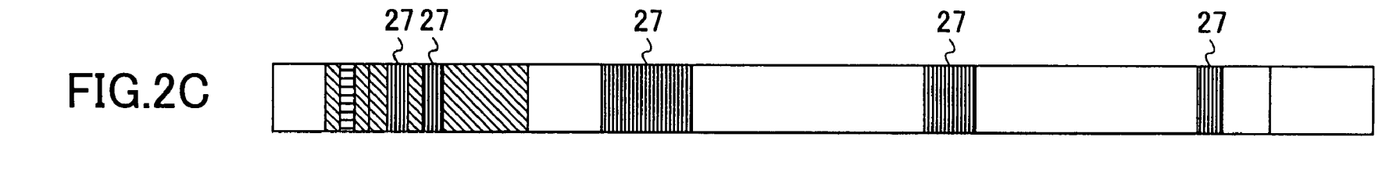

When the host computer requests for data storage or retrieval, the drive interrupts the background formatting, and stores user data 27 in or retrieves user data 27 from user data region 22 (FIG. 2C).

After completing the data storage and retrieval requested by the host computer, the drive resumes the background formatting starting from the address at which the drive interrupted the background formatting. That is, the drive formats region 28 and 29 where data have not yet been recorded.

Figure 2D:
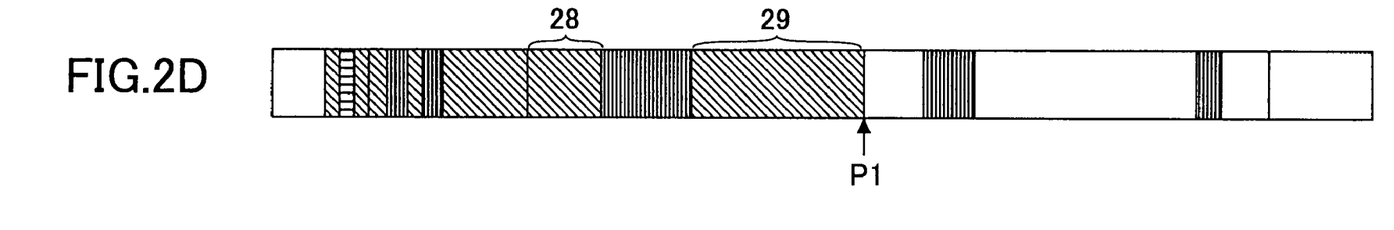

If the drive is required to eject the disk during the background formatting, the drive stores the data storage status information in FDCB 25 in lead-in region 21 before ejecting the disk (FIG. 2D). The data storage status information contains an address P1 at which the background formatting is interrupted and the information indicating in which region of the unformatted region the user data are recorded.

Various embodiments of the present invention will be described below by reference to FIGS. 3-9.

Figure 3:
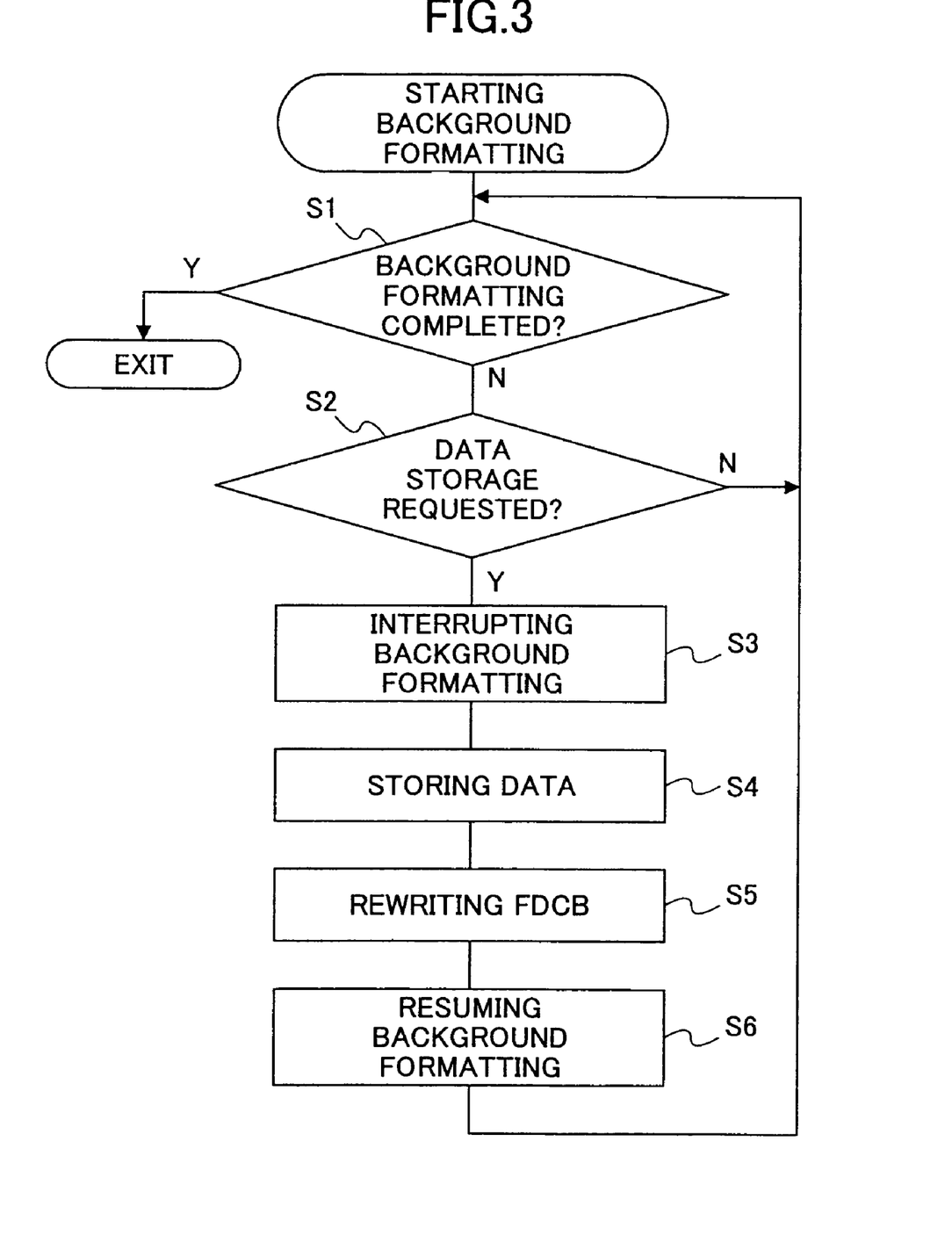
FIG. 3 is a flow chart showing background formatting of the optical disk drive showed in FIG. 1 according to the first embodiment of the present, invention.

FIG. 3 is a flow chart showing background formatting of the optical disk drive showed in FIG. 1 according to the first embodiment of the present invention. Main control unit 9 starts formatting the disk in the background. Main control unit 9 checks whether the background formatting has been completed (step S1). If the background formatting has not been completed, main control unit 9 further checks whether the host computer requests for data storage (step S2). If the host computer does not request for data storage, main control unit 9 returns to step S1. If the host computer requests for data storage, main control unit 9 interrupts the background formatting (step S3) and stores data as requested by the host computer (step S4).

Main control unit 9 stores data storage status information in Formatting Disk Control Block (FDCB) 25 of optical disk 11 (step S5). Main control unit 9 resumes the background formatting (step S6) and returns to step S1 followed by the above process. If the background formatting has been completed in step S1, main control unit 9 exits this process.

The optical disk drive according to this embodiment stores the data storage status information in FDCB 25 as soon as the optical disk drive completes data storage as requested by the host computer. Accordingly, if optical disk 11 is temporary ejected and set in the optical disk drive again, the optical disk drive can determine the data storage status information by retrieving it from FDCB 25 of optical disk 11.

In the case wherein the host computer makes a plurality of successive requests for data storage during the background formatting, it is not necessary to store data storage status information in FDCB 25 each time the host computer makes such requests. If FDCB 25 is revised too often, the performance of the optical disk drive is lowered and the degrading of the optical disk is accelerated.

Modifying the process as described below by reference to FIG. 4 may be beneficial to solve the above problem.

Figure 4:
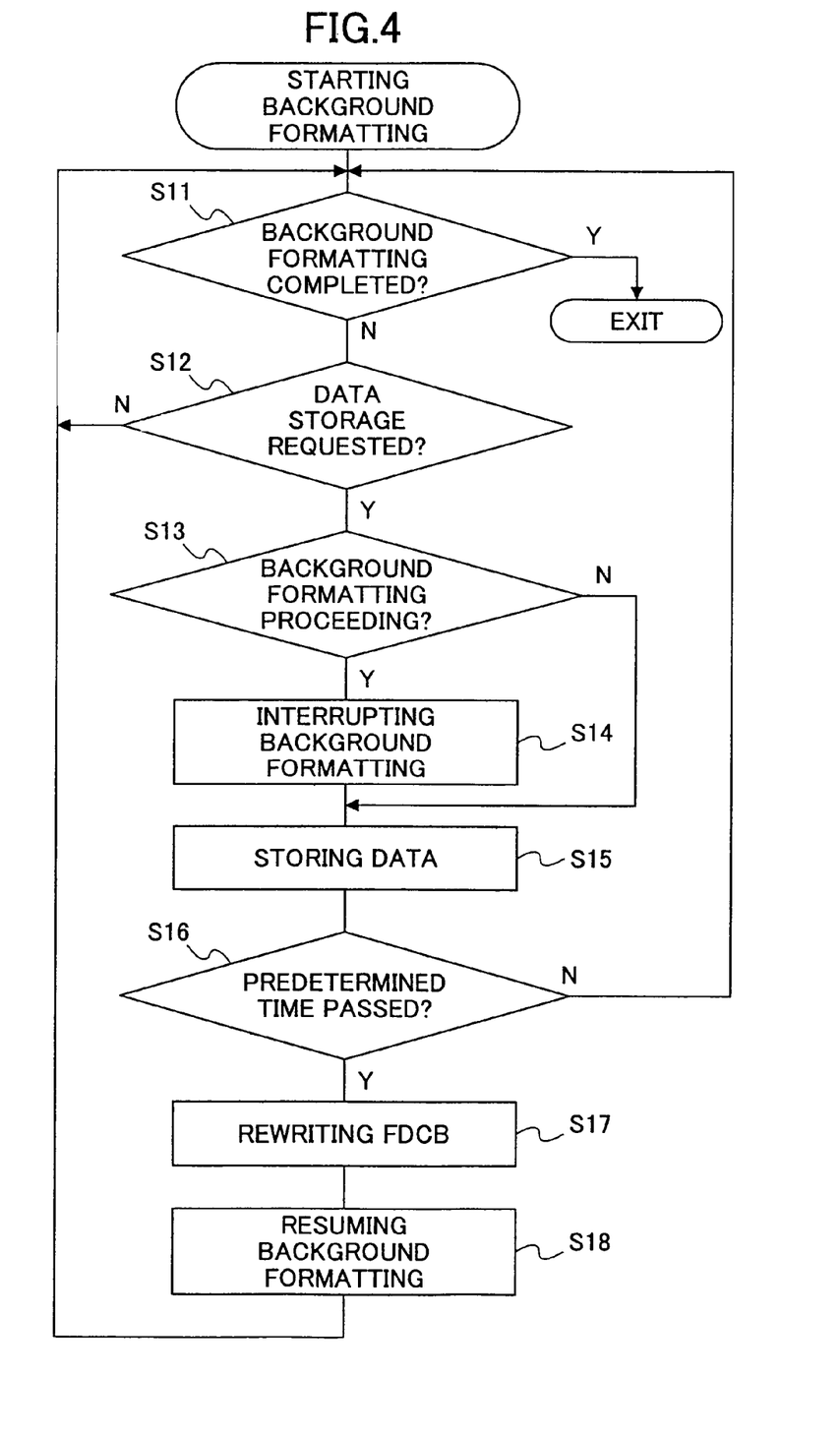
FIG. 4 is a flow chart showing background formatting of the optical disk drive showed in FIG. 1 according to the second embodiment of the present invention.

FIG. 4 is a flow chart showing background formatting of the optical disk drive showed in FIG. 1 according to the second embodiment of the present invention.

Main control unit 9 starts formatting the disk in the background. Main control unit 9 checks whether the background formatting has been completed (step S11). If the background formatting has not been completed, main control unit 9 further checks whether the host computer requests for data storage (step S12). If the host computer does not request for data storage, main control unit 9 returns to step S11. If the host computer requests for data storage, main control unit 9 checks whether the background formatting is proceeding (step S13). If the background formatting is proceeding, main control unit 9 interrupts the background formatting (step S14) and stores data as requested by the host computer (step S15).

In response to the completion of the data storage requested by the host computer, main control unit 9 starts measuring time (elapsed time) up to a predetermined time before resuming the background formatting.

Main control unit 9 checks whether the predetermined time has passed (step S16). If the predetermined time has not passed, main control unit 9 returns to step S11 and repeats the process between steps S11 and S13. If the host computer requests for data storage in step S12 and the background formatting is not proceeding in step S13, main control unit 9 goes to step S15 and stores the data as requested by the host computer. Main control unit 9 checks whether the predetermined time has passed (step S16). If the predetermined time has passed, main control unit 9 stores data storage status information in Formatting Disk Control Block (FDCB) 25 of optical disk 11 (step S17). Main control unit 9 resumes the background formatting (step S18), and returns to step S11 followed by the above process. If the background formatting has been completed in step S11, main control unit 9 exits this process.

In the case wherein the host computer makes a plurality of successive requests for data storage during the background formatting, the optical disk drive according to this embodiment revises FDCB 25 after all data are stored. Accordingly, the performance of the optical disk drive is sustained at a high level and the optical disk is not degraded since FDCB 25 is not revised (written to) too often.

Figure 5:
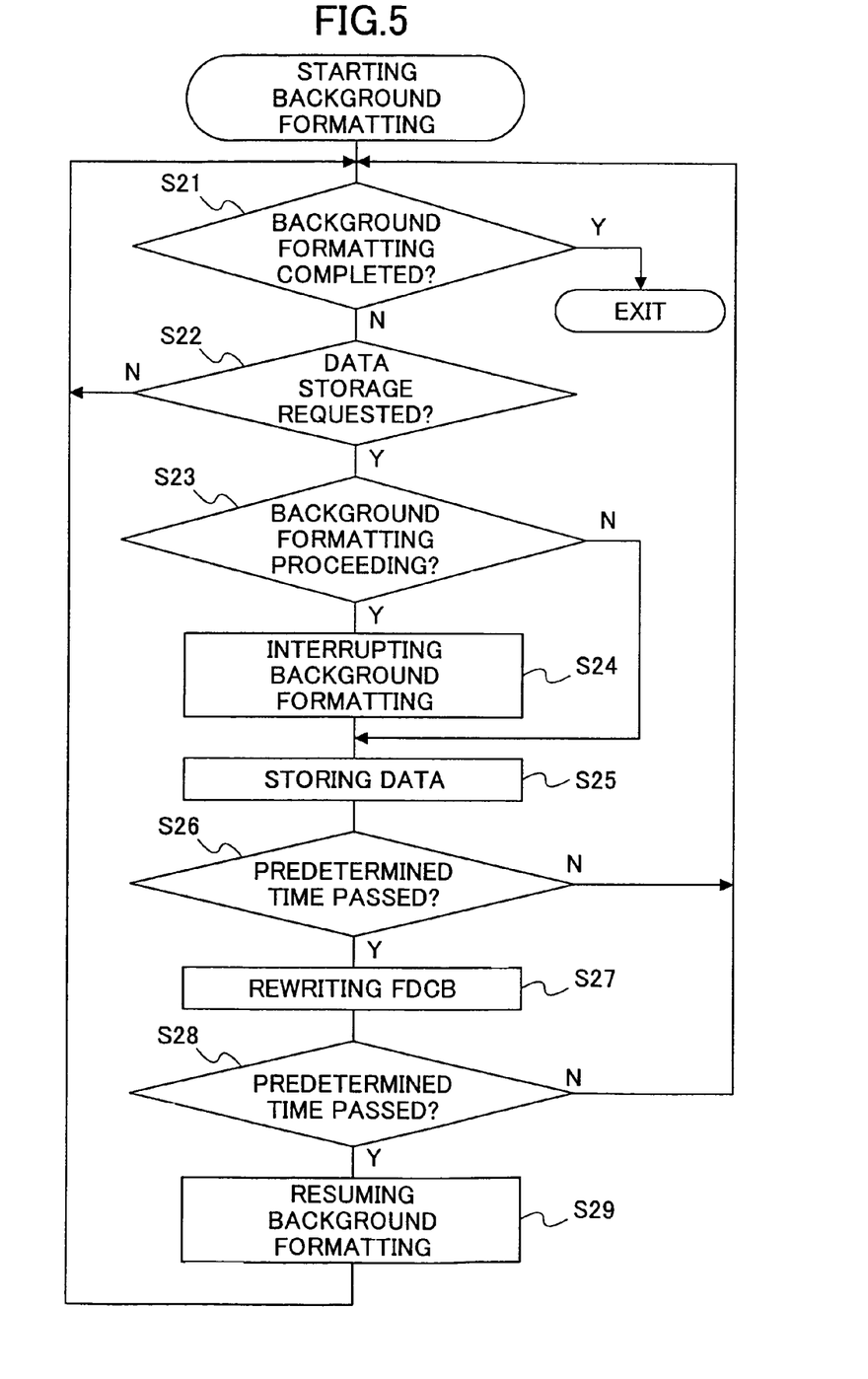
FIG. 5 is a flow chart showing background formatting of the optical disk drive showed in FIG. 1 according to the third embodiment of the present invention.

FIG. 5 is a flow chart showing background formatting of the optical disk drive showed in FIG. 1 according to the third embodiment of the present invention.

Main control unit 9 starts formatting the disk in the background. Main control unit 9 checks whether the background formatting has been completed (step S21). If the background formatting has not been completed, main control unit 9 further checks whether the host computer requests for data storage (step S22). If the host computer does not request for data storage, main control unit 9 returns to step S21. If the host computer requests for data storage, main control unit 9 checks whether the background formatting is proceeding (step S23).

If the background formatting is proceeding, main control unit 9 interrupts the background formatting (step S24) and stores data as requested by the host computer (step S25).

In response to the completion of the data storage requested by the host computer, main control unit 9 starts measuring time up to a first predetermined time before resuming the background formatting.

Main control unit 9 checks whether the predetermined time has passed (step S26). If the first predetermine time has not passed, main control unit 9 returns to step S21 and repeats the process between steps S21 and S23. If the host computer requests for data storage in step S22 and the background formatting is not proceeding in step S23, main control unit 9 goes to step S25 and stores the data as requested by the host computer. Main control unit 9 checks whether the predetermined time has passed (step S26).

If the first predetermined time has passed, main control unit 9 revises FDCB 25 (step S27). In response to completing the revision of FDCB 25, main control unit 9 starts measuring time up to a second predetermined time before resuming the background formatting. Main control unit 9 checks whether the second predetermined time has passed (step S28). If the second predetermined time has not passed, main control unit 9 returns to step S21 and repeats the process between steps S21 and S27. If the second predetermined time has passed, main control unit 9 goes to step S29 and resumes the background formatting. Then, main control unit 9 returns to step S21 and repeats the above process. If main control unit 9 determines that the background formatting has been completed at step S21, main control unit 9 exits from this process.

The third embodiment is different from the second embodiment in that the time period between the data storage and the revising of FDCB 25 is not necessarily equal to the time period between the data storage and the resuming of the background formatting.

Accordingly, in the case wherein multiple requests for data storage are made in a short period during the background formatting, the optical disk drive revises FDCB 25 after all requests for data storage are satisfied. The optical disk drive can maintain high performance and avoid damaging the FDCB region 25 of the optical disk.

Figure 6:
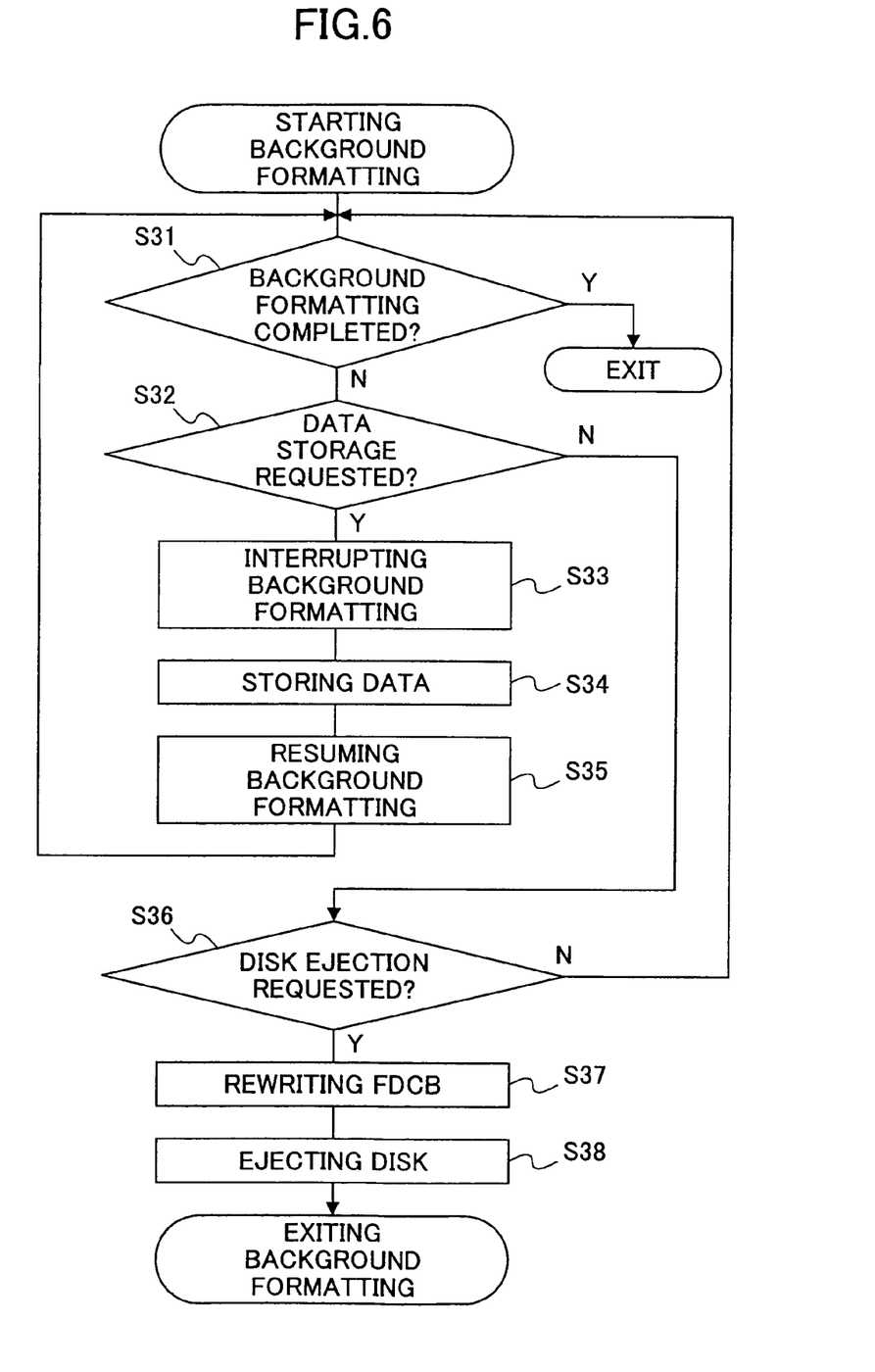
FIG. 6 is a flow chart showing background formatting of the optical disk drive showed in FIG. 1 according to the fourth embodiment of the present invention.

FIG. 6 is a flow chart showing background formatting of the optical disk drive showed in FIG. 1 according to the fourth embodiment of the present invention.

Main control unit 9 starts formatting the disk in the background. Main control unit 9 checks whether the background formatting has been completed (step S31). If the background formatting has not been completed, main control unit 9 further checks whether the host computer requests for data storage (step S32). If the host computer requests for data storage, main control unit 9 interrupts the background formatting (step S33). Main control unit 9 stores data in optical disk 11 as requested by the host computer (step S34). Then, main control unit 9 resumes the background formatting (step S35) and returns to step S31.

If the host computer does not request for data storage in step S32, main control unit 9 checks whether the host computer (that is, the user) requests to eject optical disk 11 (step S36). If the host computer does not request to eject optical disk 11, main control unit 9 returns to step S31 and repeats the above process. Main control unit 9 exits this process if it determines that the background formatting has been completed in step S31. If the host computer requests to eject optical disk 11 in step S36, main control unit 9 interrupts the background formatting and revises FDCB 25 (step S37). Main control unit 9 ejects optical disk 11 (step S38) and exits this process.

As described above, in the case wherein the host computer makes multiple successive requests for data storage, main control unit 9 revises FDCB 25 after performing all data storage requested by the host computer. Accordingly, the optical disk drive can maintain a high level performance and damage the FDCB 25 region of the optical disk less.

Figure 7:
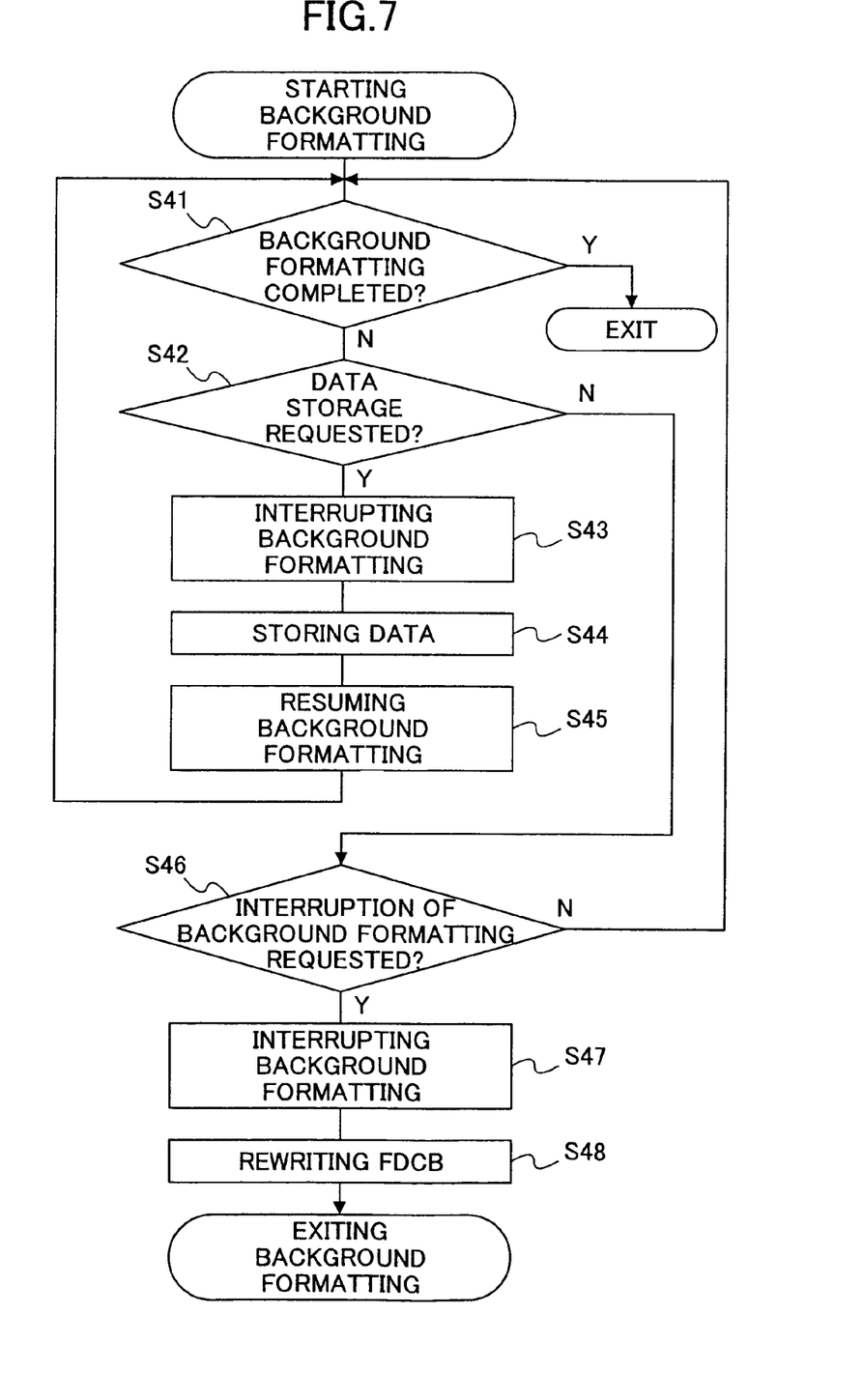
FIG. 7 is a flow chart showing background formatting of the optical disk drive showed in FIG. 1 according to the fifth embodiment of the present invention.

If the user wants to take out the optical disk such as DVD+ RW while the optical disk is being formatted in the background, the optical disk drive needs to interrupt the background formatting. The fifth embodiment of the present invention operates without causing any problem under such situation.

FIG. 7 is a flow chart showing background formatting of the optical disk drive showed in FIG. 1 according to the fifth embodiment of the present invention.

Main control unit 9 starts formatting the disk in the background. Main control unit 9 checks whether the background formatting has been completed (step S41). If the background formatting has not been completed, main control unit 9 further checks whether the host computer requests for data storage (step S42). If the host computer requests for data storage, main control unit 9 interrupts the background formatting (step S43). Main control unit 9 stores data in optical disk 11 as requested by the host computer (step S44). Then, main control unit 9 resumes the background formatting (step S45) and returns to step S41.

If the host computer does not request for data storage in step S42, main control unit 9 checks whether the host computer requests to interrupt the background formatting (step S46). If the host computer does not request to interrupt the background formatting, main control unit 9 returns to step S41 and repeats the above process. Main control unit 9 exits from this process if it determines that the background formatting has been completed in step S41. If main control unit 9 determines that the host computer requests to interrupt the background formatting in step S46, main control unit 9 interrupts the background formatting (step S47). Main control unit 9 revises FDCB 25 (step S48) and exits this process.

As described above, in the case wherein the user requests data storage during the background formatting, main control unit 9 does not revise FDCB 25 in response to each data storage request of the user. Accordingly, the optical disk drive can maintain a high level performance and damage the FDCB 25 region of the optical disk less. If the user wants to take out the optical disk during the background formatting, the optical disk drive interrupts the background formatting based on the user's request and ejects the optical disk after revising FDCB 25.

Figure 8:
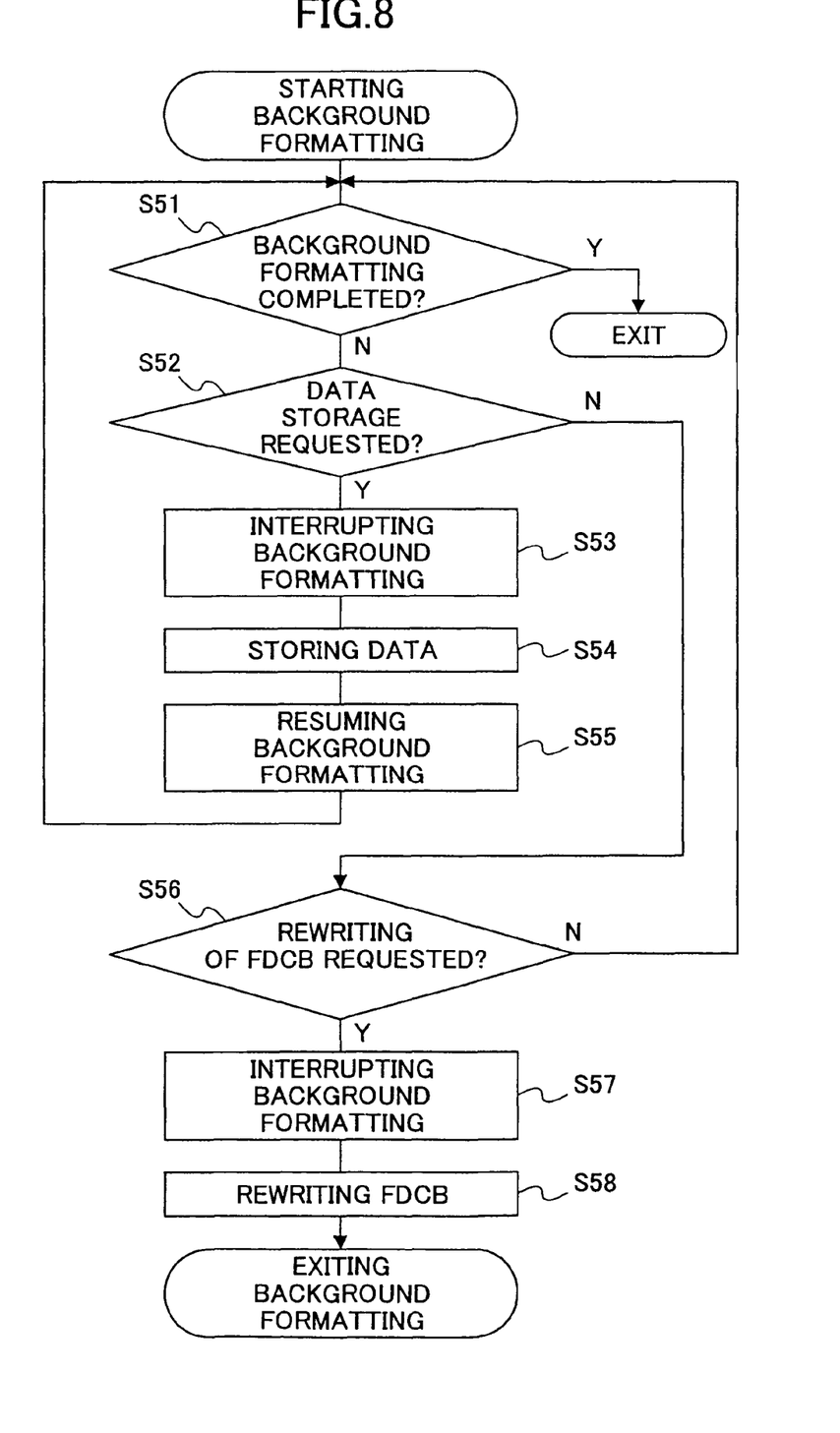
FIG. 8 is a flow chart showing background formatting of the optical disk drive showed in FIG. 1 according to the sixth embodiment of the present invention.

It is the user that takes out the optical disk during the background formatting or turns off the optical disk drive. Likewise, the user can cause the optical disk drive to revise FDCB 25. In the sixth embodiment of the present invention, the optical disk drive revises FDCB 25 in response to the user's request to do so.

FIG. 8 is a flow chart showing the background formatting of the optical disk drive showed in FIG. 1 according to the sixth embodiment of the present invention.

Main control unit 9 starts formatting the disk in the background. Main control unit 9 checks whether the background formatting has been completed (step S51). If the background formatting has not been completed, main control unit 9 further checks whether the host computer requests for data storage (step S52). If the host computer requests for data storage, main control unit 9 interrupts the background formatting (step S53). Main control unit 9 stores data in optical disk 11 as requested by the host computer (step S54). Then, main control unit 9 resumes the background formatting (step S35) and returns to step S51.

If the host computer does not request for data storage in step S52, main control unit 9 checks whether the host computer requests to revise FDCB 25 (step S56). If the host computer does not request to revise FDCB 25, main control unit 9 returns to step S51 and repeats the above process. Main control unit 9 exits this process if it determines that the background formatting has been completed in step S51. If main control unit 9 determines that the host computer requests to revise FDCB 25 in step S56, main control unit 9 interrupts the background formatting (step S57). Main control unit 9 revises FDCB 25 as requested by the host computer (step S58) and exits the background formatting process.

In this embodiment, the revision of FDCB 25 is performed based on the user's request. Accordingly, FDCB 25 of the optical disk is revised at the most appropriate timing based on the user's request. The optical disk drive can maintain a high level performance and damage the FDCB 25 region of the optical disk less.

As described above, FDCB 25 includes various items of information therein, such as information (address) indicating the region that has been formatted in the background and the unformatted region where user data are recorded. These information items are useful in avoiding storing dummy data in the unformatted region where the user data have been recorded.

Figure 9:
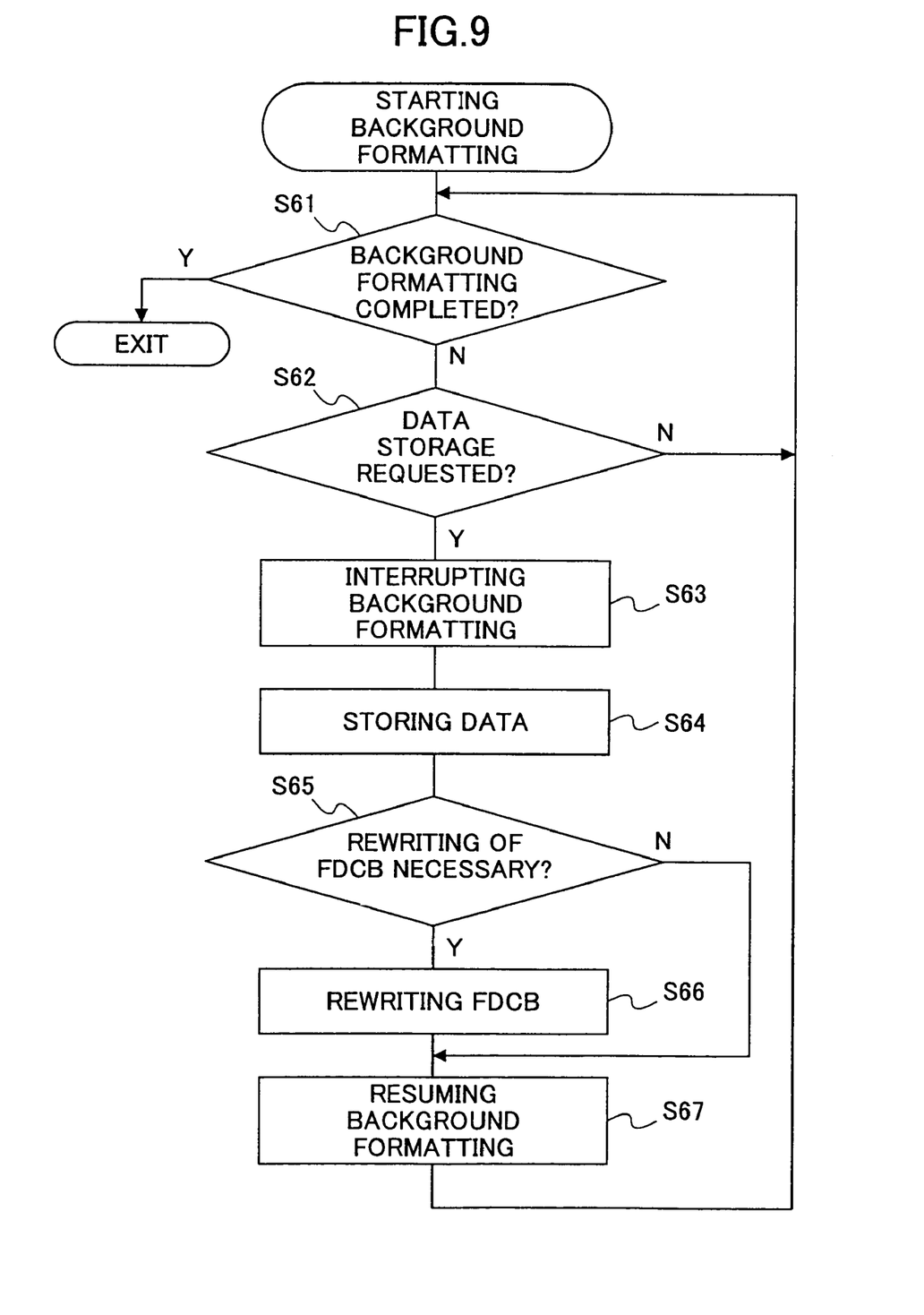
FIG. 9 is a flow chart showing background formatting of the optical disk drive showed in FIG. 1 according to the seventh embodiment of the present invention.

Accordingly, it is not necessary to revise FDCB 25 in the case wherein the user data are stored only in the formatted region during the background formatting and the case wherein the optical disk is not being formatted in the background. Accordingly, the optical disk drive according to the seventh embodiment that will be described below revises FDCB 25 only when the information to be stored in FDCB 25 has changed.

FIG. 9 is a flow chart showing the background formatting of the optical disk drive showed in FIG. 1 according to the seventh embodiment of the present invention.

Main control unit 9 starts formatting the disk in the background. Main control unit 9 checks whether the background formatting has been completed (step S61). If the background formatting has not been completed, main control unit 9 further checks whether the host computer requests for data storage (step S62). If the host computer request for data storage, main control unit 9 interrupts the background formatting (step S63). Main control unit 9 stores data in optical disk 11 as requested by the host computer (step S64). Main control unit 9 checks whether the information stored in FDCB 25 needs to be changed.

If the information stored in FDCB 25 does not need to be changed, main control unit 9 resumes, the background formatting (step S67). Main control unit 9 returns to step S61 and repeats the above process. If the information stored in FDCB 25 needs to be revised, main control unit 9 revises FDCB 25 (step S66) before resuming the background formatting in step S67. Main control unit 9 exits this process if it determines that the background formatting has been completed in step S61.

As described above, the optical disk drive according to this embodiment revises FDCB 25 only when the information stored in FDCB 25 needs to be revised. Accordingly, the optical disk drive can maintain a high level performance and avoid damaging the FDCB 25 region of the optical disk caused by frequent revision (rewriting) of FDCB 25 information in response to requests for data storage, for example, by the user.

Figure 10:
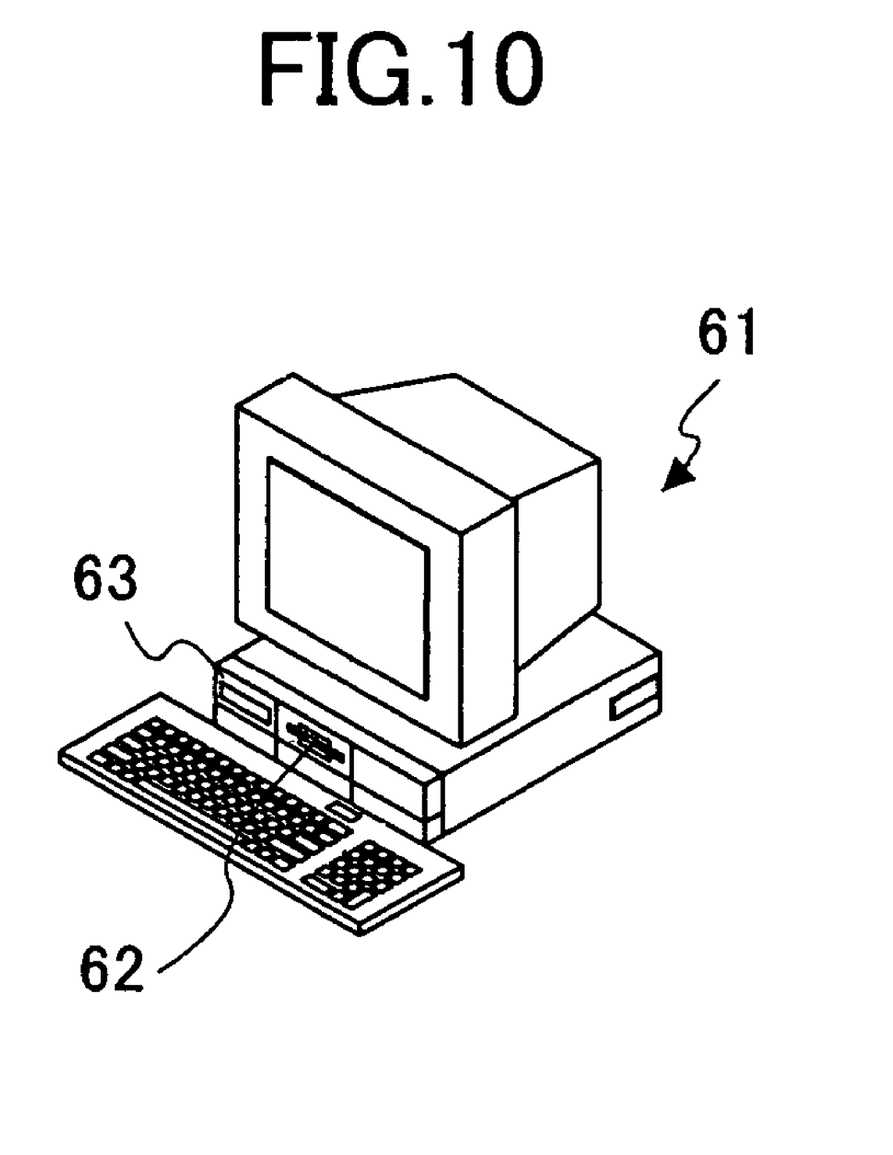
FIG. 10 is a schematic drawing showing an information processing system having a data storage apparatus according to another embodiment of the present invention.

Yet another embodiment of the present invention will be described below by reference to FIG. 10. An information processing system 61 includes a 3.5 inch flexible disk drive 62 and an optical disk drive 63 such as a DVD+RW drive according to an embodiment of the present invention. The optical disk drive may be a CD-RW drive that embodies the present invention. The optical disk drive 63 is embedded in the information processing system 61, but the optical disk drive 63 may be a so-called built-in type. The host computer is embedded in the information processing system 61 in this case.

Since the information processing system 61 includes the data storage apparatus 63 according to an embodiment, a user of the information processing system 61 can obtain the benefits of the features and advantages of the present invention.

The optical disk drive 63 may be a stand-alone type that is separate from and controlled by an external host computer. The information processing system 61 is not limited to a desk top type personal computer, but it may be a notebook type personal computer.

As described above, a data storage apparatus according to an embodiment of the present invention can revise control information indicating the address up to which the background formatting has been performed and the address of an unformatted recording region in which user data has been recorded, for example, at an appropriate timing during the background formatting.

The preferred embodiments of the present invention are described above. The present invention is not limited to these embodiments, but various variations and modifications may be made without departing from the scope of the present invention.

This patent application is based on Japanese priority patent application No. 2001-229258 filed on Jul. 30, 2001, the entire contents of which are hereby incorporated by reference.

What is claimed is:

1. A method comprising:
   background formatting a rewritable recording medium;
   receiving a host request for data storage;
   interrupting the background formatting;
   storing data as requested by the host;
   immediately after storing data requested by the host, determining whether control information stored in a predetermined region of the rewritable recording medium needs to be updated; and
   if so, updating the control information before resuming background formatting, wherein the control information comprises bit map information indicating where the rewritable recording medium is formatted.

2. The method of claim 1, further including resuming the background formatting after updating the control information.

3. The method of claim 1, wherein the rewritable recording medium is a DVD+RW.

4. The method of claim 1, wherein the predetermined region is located in a lead-in area of the rewritable recording medium.

5. The method of claim 1, wherein the predetermined region is a formatting disk control block of the rewritable recording medium.

* * * * *